April 30, 1968     M. D. MARTIN     3,380,328
ROTARY DIE CUTTER
Filed Dec. 8, 1965
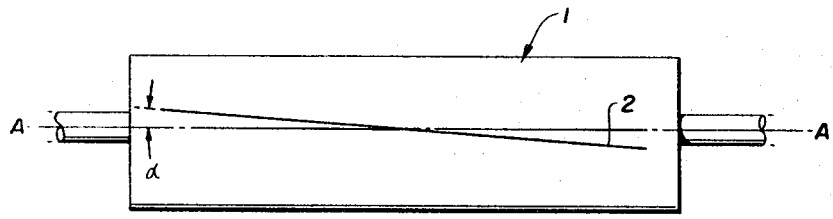
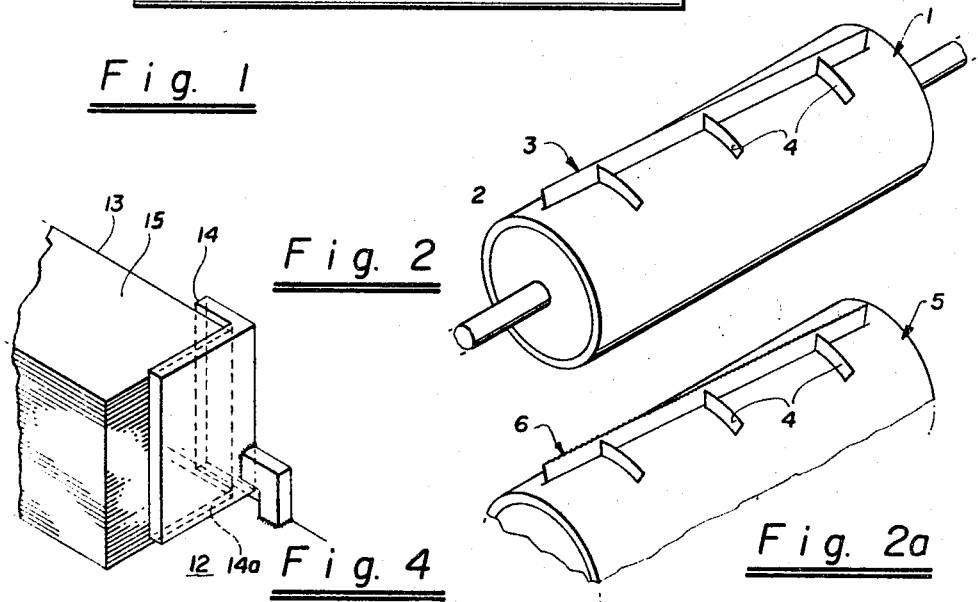
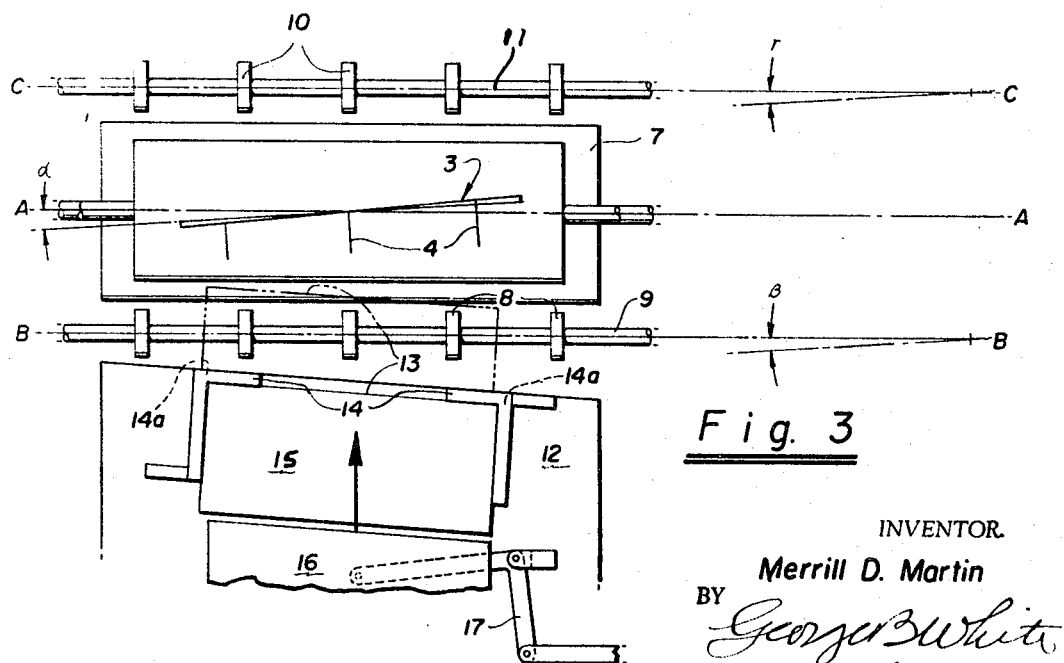
INVENTOR.
Merrill D. Martin
BY
*George B White*
Attorney

United States Patent Office 3,380,328
Patented Apr. 30, 1968

3,380,328
ROTARY DIE CUTTER
Merrill D. Martin, 2 Mall Court,
Oakland, Calif. 94611
Filed Dec. 8, 1965, Ser. No. 512,368
3 Claims. (Cl. 83—156)

ABSTRACT OF THE DISCLOSURE

A die rule layout of helical configuration fixed on the outer surface of a rotating cutting cylinder of a rotary die cuter. The helix of the configuration is inclined to the longitudinal axis of said cylinder at an angle from one quarter of an inch to one-half of an inch per foot. Feed rollers and takeoff rollers, the longitudinal axes of which are parallel with the axis of said cutting cylinder. A feed table and means to feed supply blanks to said feed rollers one blank at a time in such position that the advancing edge of each blank is inclined relatively to the longitudinal axis of the cutting cylinder at an angle equal to said helix angle. The thrust of the cutting action of said rule is received by an anvil beneath said cylinder.

Brief description of the invention

An improved rotary die cutter in which the pressure resulting from making a long cut is greatly reduced, because the pressure is applied gradually and progressively by a die rule of a generally helical configuration on the surface of the cutting cylinder and at an angle to the axis of said cylinder, the blanks being fed by feed rollers parallel with the axis of said cylinder but being positioned so that the advancing edge of each blank is inclined relatively to said axis at an angle equal to the angle of said rule.

Description of figures

FIG. 1 represents a diagrammatic plan view of the rotating cutting cylinder of my invention showing the layout line for the die rule.

FIG. 2 is an isometric view of the cutting cylinder showing the die rule in place.

FIG. 2a is an alternate embodiment of the die rule of my invention having a serrated edge.

FIG. 3 is a schematic plan view of a die cutter of my invention showing the relative arrangement of rotating cylinder, die rule, anvil or platen, feed and takeoff rollers, feed table and blanks.

FIG. 4 is a fragmental perspective view of a stack of sheets and one of the vertical angle stops.

Detailed description

Referring now to the drawings, I may use for my invention a wooden cylindrical cutting roller 1 as is done with conventional machines of this type. I establish a pitch line 2 across the cylindrical surface of roller 1 which has a predetermined angle alpha with relation to the longitudinal axis A—A of my roller 1. The reason for this will become evident from the explanation below. I have found that an angle of one-quarter of an inch per foot to one-half of an inch per foot is the most satisfactory for the operation of my invention.

This pitch line 2 forms the basis for a groove into which I insert my die rule 3 with its backing supports 4 as may best be seen in FIG. 2. The die rule 3 is securely fastened to the roller 1 in any manner known to those skilled in the art and more particularly as described in my Patent No. 3,170,358. The die rule 3 may have a plane sharp cutting edge or it may take the form shown at FIG. 2a in which the die rule 5 has a serrated tooth edge 6.

When I use a plane sharp edge for my rule, I use an anvil in the form of a steel platen roller 7 for the blade to work against; while when I use a serrated tooth I make my platen roller 7 of rubber or other resilient material.

Feed rollers 8 are positioned on feed shaft 9 along with axis B—B. Axis B—B is parallel with axis A—A of the cutting cylinder. Likewise, takeoff rollers 10 are positioned on takeoff shaft 11 along axis C—C and axis C—C is parallel with axis A—A of the cutting cylinder, all of which may best be seen in FIG. 3.

Feed table 12 is positioned adjacent to the feed rollers 8. Vertical angle stops 14 are suitably supported above the feed table 12 so as to locate a vertical stack of rectangular blanks 15 in such a manner that the forward edges 13 of the blanks in the stack 15 are parallel with the pitch line 2, namely at an angle equal to alpha to axis A—A of the cutting cylinder. The vertical angle stops 14 are so supported that the bottoms thereof are spaced above the table 12 to form a horizontal slot 14a flush with the top of the table 12 and of a width to accommodate a single blank of the stack 15 at a time for discharge. Preferably the forward edge of the table 12 is also parallel with the pitch line 2.

A pusher 16 and pusher mechanism 17 (shown only partially), are positioned and disposed to feed single blanks from the bottom of stack 15 through the horizontal slot 14a to the feed rollers 8. Each blank is thus fed to the rollers 8 so that its forward or advancing edge 13 is parallel to the pitch line 2, but the blank moves on a path at right angles to the axis A—A of the cutting cylinder.

For the successful operation of my invention it is necessary that the angle alpha of the pitch line 2 which corresponds to the helix angle of the die rule 3 be equal to the angle of the forward edges 13 of the blanks of the stack 15 to the axis A—A.

The word "die" or "die rule" herein refers to dies of a variety of shapes, sizes, and designs, whereby dies fitting over a cylinder cut a rectangular sheet into the final desired shape or design. The various shapes of dies, for cutouts, scores and creases, are mounted generally at an angle equal to angle alpha, which places the total layout for the particular operation on a helix upon a mounting cylinder. Die lay-out means the arrangement of a single helical die or a multiple die, or a die design cutting in several directions, and the general longitudinal lay-out on the cutting cylinder is always helical at said alpha angle. FIGS. 2 and 2a illustrate a die cut with longitudinal and transverse slits which normally would produce considerable shaft deflection when cut parallel to axis A—A of the shaft of the cutter cylinder, but when mounted helically as herein shown, the shaft deflection is minimized and such cut becomes feasible. The same advantage applies to various complex cuts.

In FIG. 3 my cutting cylinder 1 is shown in the position in which the die rule is on the diametric end of the roller 1, opposite to platen 7. When the die rule starts its cutting action it is 180° away from the position shown in FIG. 3. A blank will be fed into the cutting cylinder at right angles to axis A—A, but positioned with its forward edge 13, at an angle equal to alpha and as the cutting action progresses it will proceed along the helical edge of the die rule 3 and be sheared thereby. It will now be evident that the blank will be cut off straight across its edge and also transversely as shown, but that instead of this being done in a single simultaneous cut across the entire surface, it will be done gradually as the cutting edge of die rule 3 progresses under the rotative action of cutting cylinder 1. Thus I am able to eliminate the high pressure and resultant stresses which accompany this cutting process with existing machines as described above. The takeoff rollers 10 then assist in properly removing the cut off blanks from the machine.

While I have described a preferred embodiment of my invention, it will now be evident to those skilled in the art that variations may be made in the embodiment described above without departing from my basic invention and I do not limit myself to this embodiment except as I do so in the claims which follow.

I claim:
1. A rotary die cutter for the straight cutting of corrugated boxboard, cardboard, or fiber blanks and the like comprising:
   (a) a rotating cutting cylinder,
   (b) a die rule lay-out of helical configuration fixedly positioned on the outer surface of said cylinder,
   (c) said die rule lay-out having a helix angle bearing a predetermined angular relation to the longitudinal axis of said cylinder,
   (d) feed rollers and takeoff rollers positioned adjacent to the inlet and outlet edges of said cutting cylinder respectively,
   (e) the longitudinal axis of said rollers being parallel to each other and parallel with the longitudinal axis of said cutting roller,
   (f) a feed table positioned adjacent to said feed rollers,
   (g) means above said table disposed to supply said blanks to said rollers, one blank at a time, so that the advancing edges of said blanks are inclined to the longitudinal axis of said cutting cylinder at an angle equal to said helix angle,
   (h) an anvil positioned beneath said cylinder and disposed to receive the thrust of the cutting action of said rule on said blanks.

2. The device of claim 1 in which said helix is inclined to said longitudinal axis at an angle of from one-quarter of an inch to one-half of an inch per foot.

3. The device of claim 1 in which said die rule lay-out has a serrated tooth cutting edge and said anvil comprises a rotating cylinder of a resilient material.

References Cited
UNITED STATES PATENTS

| | | | |
|---|---|---|---|
| 454,316 | 6/1891 | Wheeler | 83—341 X |
| 1,006,783 | 10/1911 | Paquin | 83—341 |
| 1,012,538 | 12/1911 | Fisher et al. | 83—417 |
| 3,203,292 | 8/1965 | Schmermund | 83—341 |
| 3,230,809 | 1/1966 | Liick | 83—341 |

ANDREW R. JUHASZ, *Primary Examiner.*